(12) United States Patent
Saito

(10) Patent No.: US 11,835,910 B2
(45) Date of Patent: Dec. 5, 2023

(54) POWER SOURCE APPARATUS AND IMAGE FORMING APPARATUS HAVING A CONTROL UNIT CONFIGURED TO SWITCH A TARGET VOLTAGE OF AN OUTPUT VOLTAGE OUTPUT FROM A SECONDARY SIDE OF A TRANSFORMER

(71) Applicant: CANON KABUSHIKI KAISHA, Tokyo (JP)

(72) Inventor: Yusuke Saito, Shizuoka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/748,624

(22) Filed: May 19, 2022

(65) Prior Publication Data

US 2022/0397855 A1 Dec. 15, 2022

(30) Foreign Application Priority Data

Jun. 11, 2021 (JP) ................. 2021-098068

(51) Int. Cl.
  *G03G 15/00* (2006.01)
  *H02M 3/335* (2006.01)
(52) U.S. Cl.
  CPC ........ *G03G 15/80* (2013.01); *H02M 3/33523* (2013.01)
(58) Field of Classification Search
  USPC .......................................................... 399/88
  See application file for complete search history.

(56) References Cited

U.S. PATENT DOCUMENTS

| 10,432,084 | B2 | 10/2019 | Saito |  |
|---|---|---|---|---|
| 2015/0023065 | A1* | 1/2015 | Naruse | ............... G03G 15/5004 363/21.01 |
| 2021/0240120 | A1 | 8/2021 | Saito |  |

FOREIGN PATENT DOCUMENTS

| CN | 104578801 A | * | 4/2015 | ........ H02M 3/33515 |
|---|---|---|---|---|
| JP | H01-157298 A |  | 6/1989 |  |
| JP | 2004-56854 A |  | 2/2004 |  |
| JP | 2021-48694 A |  | 3/2021 |  |

* cited by examiner

*Primary Examiner* — Quana Grainger
(74) *Attorney, Agent, or Firm* — VENABLE LLP

(57) ABSTRACT

A power source apparatus including a control unit configured to output a control signal to a switching element to switch a target voltage of an output voltage from a transformer. In a case of increasing the output voltage, the control unit outputs the control signal having a first duty when the target voltage is lower than a first threshold value, and outputs the control signal having a second duty larger than the first duty when the target voltage is switched to a value equal to or higher than the first threshold value. In a case of reducing the output voltage, the control unit outputs the control signal having the second duty when the target voltage is equal to or higher than a second threshold value, and outputs the control signal having the first duty when the target voltage is switched to a value lower than the second threshold value.

18 Claims, 10 Drawing Sheets

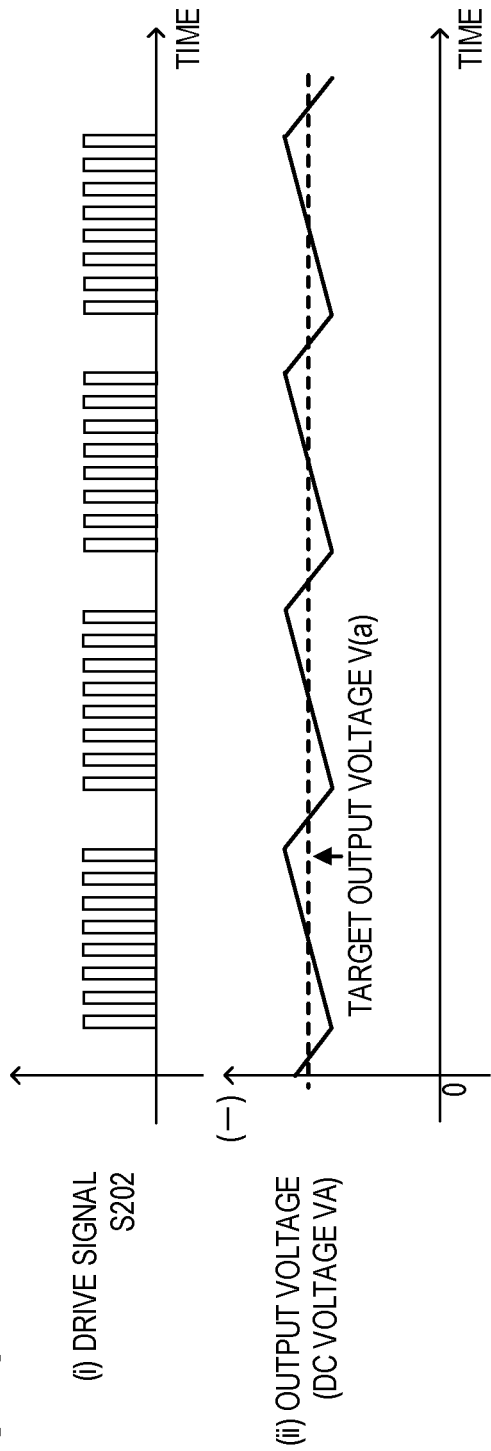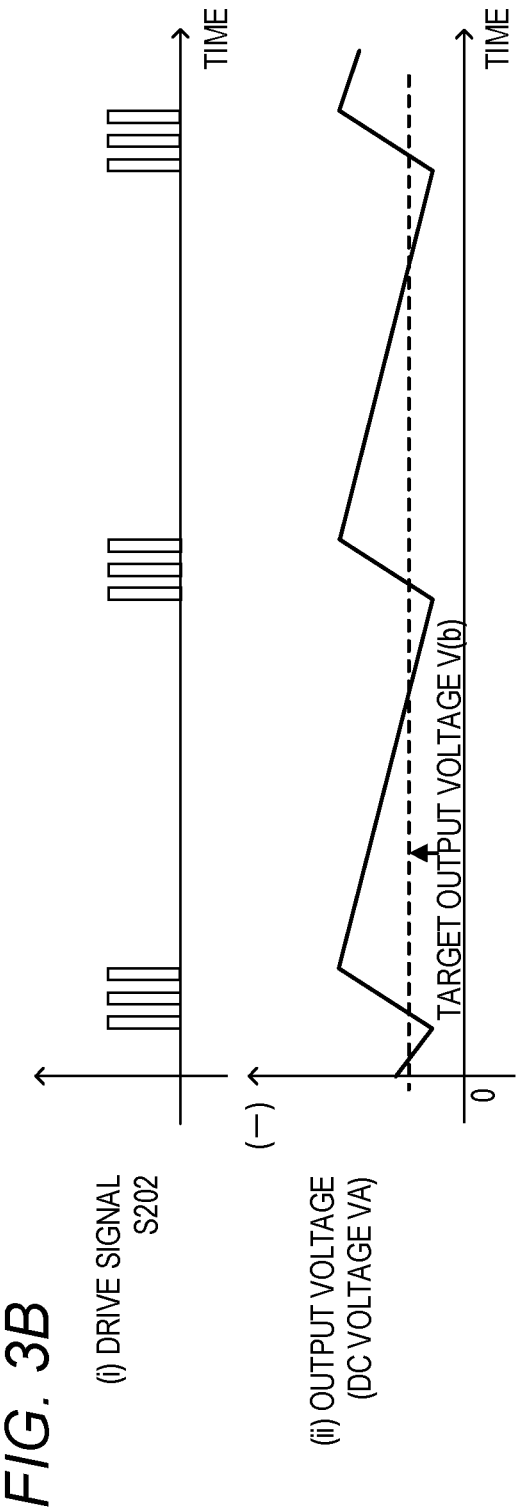

POWER SOURCE APPARATUS AND IMAGE FORMING APPARATUS HAVING A CONTROL UNIT CONFIGURED TO SWITCH A TARGET VOLTAGE OF AN OUTPUT VOLTAGE OUTPUT FROM A SECONDARY SIDE OF A TRANSFORMER

BACKGROUND OF THE INVENTION

Field of the Invention

The present invention relates to a power source apparatus and an image forming apparatus, and to a method of controlling a high voltage power source in an electrophotographic or electrostatic recording type image forming apparatus, such as a copying machine or a printer.

Description of the Related Art

In the related art, there has been proposed a high voltage power source including a transformer and a switching element configured to be turned on or off by a drive pulse signal. For the high voltage power source, there has been proposed a method of controlling an output voltage of the transformer, a frequency of the drive pulse signal, and a duty of the drive pulse signal in association with one another (Japanese Patent Application Laid-Open No. 2021-048694).

In the related-art circuit, the duty of the drive pulse signal has been selected depending on a range of an output voltage. Accordingly, when a defined range of the output voltage is exceeded, the duty of the drive pulse signal is switched. In other words, when the output voltage is to be changed, and when the defined range of the output voltage is exceeded, it is required to switch the frequency or the duty of the drive pulse signal. Thus, when the frequency or the duty is switched, there is a fear in that a ripple may be generated in the output voltage, or that electric power of the switching element, for example, a field effect transistor to be turned on or off by the drive pulse signal may be increased. Consequently, in a case in which the high voltage power source is mounted in an image forming apparatus, when the output voltage is to be changed in one job, it may be desired to prevent the duty of the drive pulse signal from being switched in some cases.

SUMMARY OF THE INVENTION

The present invention has been made in view of the above-mentioned situation, and therefore has an object to reduce, in a power source apparatus configured to change an output voltage, generation of a ripple in the output voltage and power consumption.

In order to solve the above-mentioned problem, according to an embodiment of the present invention, there is provided a power source apparatus, comprising: a transformer including a primary coil and a secondary coil; a switching element which is connected in series to the primary coil, and is configured to be turned on or off according to a control signal input to the switching element; and a control unit configured to control the switching element by outputting the control signal having a predetermined duty to the switching element, wherein the control unit is configured to switch a target voltage of an output voltage that is output from a secondary side of the transformer, wherein the control unit is configured to: in a case of increasing the output voltage by switching the target voltage, output the control signal having a first duty when the target voltage is lower than a first threshold value, and output the control signal having a second duty which is larger than the first duty when the target voltage is switched to a value equal to or higher than the first threshold value; and in a case of reducing the output voltage by switching the target voltage, output the control signal having the second duty when the target voltage is equal to or higher than a second threshold value, and output the control signal having the first duty when the target voltage is switched to a value lower than the second threshold value, and wherein the first threshold value and the second threshold value are different from each other.

Further features of the present invention will become apparent from the following description of exemplary embodiments with reference to the attached drawings.

BRIEF DESCRIPTION OF THE DRAWINGS

FIG. 3A and FIG. 3B are graphs for showing output characteristics of the high voltage power source unit in the first embodiment.

DESCRIPTION OF THE EMBODIMENTS

Modes for carrying out the present invention are now described in detail based on embodiments with reference to the accompanying drawings.

First Embodiment

In a first embodiment, a threshold value Vth1 of an output voltage in a sequence of increasing the voltage and a threshold value Vth2 of the output voltage in a sequence of reducing the voltage are set to different values. Description is given of a method of selecting, with such setting, an optimal duty and an optimal frequency of a drive signal (S202 to be described later) depending on an output voltage at the beginning.

Configuration of Image Forming Apparatus

Figure 1:
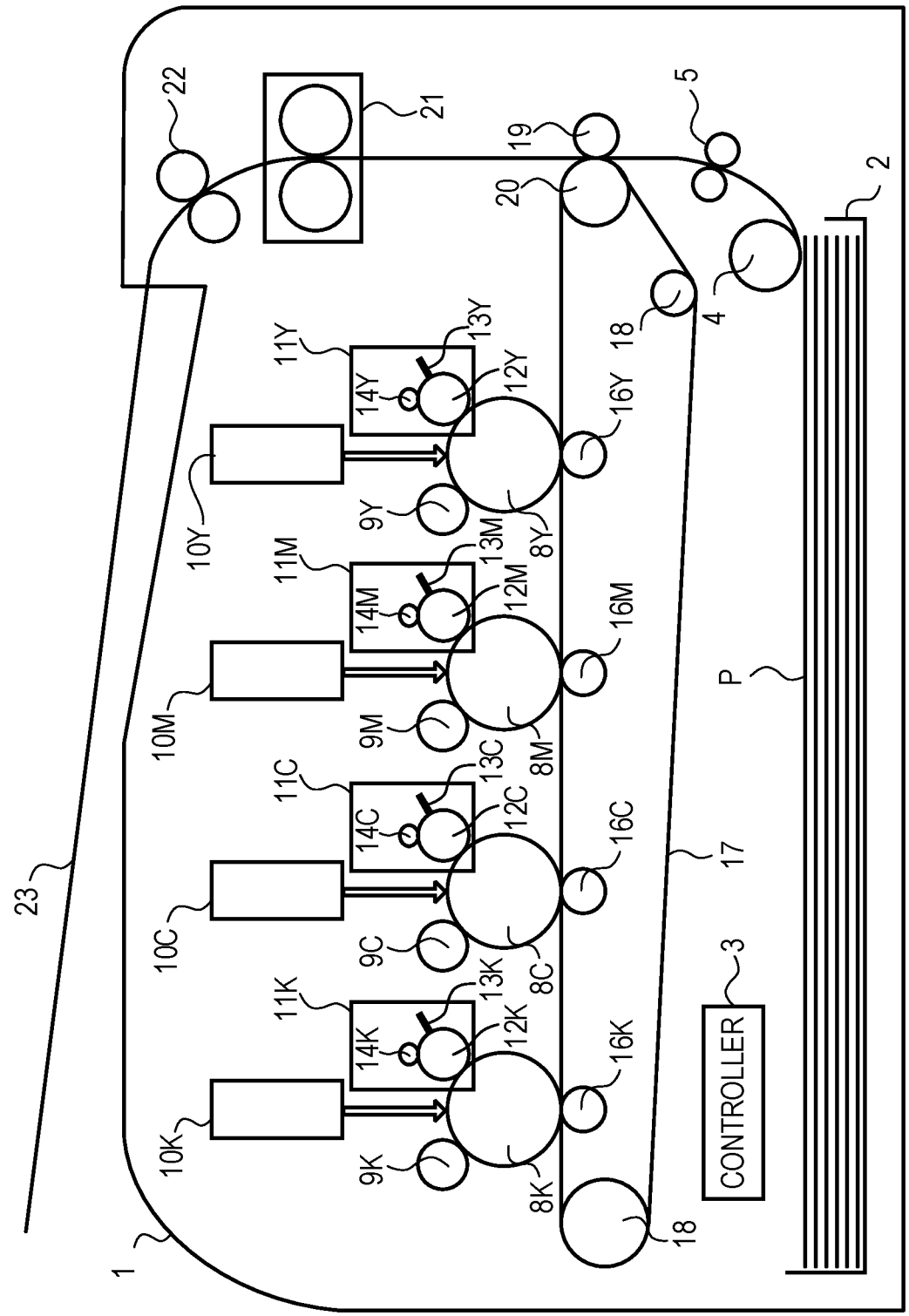
FIG. 1 is a configuration view of an image forming apparatus according to a first embodiment and a second embodiment.

FIG. 1 is a configuration view for illustrating a tandem type (4-drum type) image forming apparatus employing an intermediate transfer belt. Components of an image forming apparatus 1 are as follows. A feed cassette 2 is a cassette which stores a sheet P which is a recording medium. An image forming controller (hereinafter referred to as "controller") 3, which is a control unit, controls an image forming operation of the image forming apparatus 1. A feed roller 4 is a roller which feeds the sheet P from the feed cassette 2, and conveying rollers 5 are rollers which convey the fed sheet P. Photosensitive drums 8Y, 8M, 8C, and 8K, which are image bearing members, bear developers of the colors of yellow, magenta, cyan, and black. The suffixes Y, M, C, and K of the reference symbols represent the respective colors, and are omitted except when a member for a particular color is described.

A charging roller 9 is a roller for uniformly charging the photosensitive drum 8 to a predetermined potential. An optical unit 10 irradiates the photosensitive drum 8 charged by the charging roller 9 with a laser beam corresponding to image data of each color to form an electrostatic latent image. A developing device 11 visualizes the electrostatic latent image formed on the photosensitive drum 8 to form a toner image. A developing roller 12 is a roller for delivering the developer in the developing device 11 to a portion opposed to the photosensitive drum 8. A developing blade 13, which is a development regulating member, is a member for regulating toner on the developing roller 12 into a thin layer. A supply roller 14 is a roller for supplying the toner to the developing roller 12. Further, the supply roller 14 also has a function of stripping off excessively supplied toner by switching (changing) a voltage applied to the supply roller 14. A voltage applied to the charging roller 9 is referred to as "charging voltage." A voltage applied to the developing roller 12 is referred to as "developing roller voltage." A voltage applied to the developing blade 13 is referred to as "developing blade voltage." The voltage applied to the supply roller 14 is referred to as "supply roller voltage."

A primary transfer roller 16 is a roller for transferring (hereinafter referred to as "primarily transferring") the toner image formed on the photosensitive drum 8. An intermediate transfer belt 17 is a belt which bears the primarily transferred toner image. Drive rollers 18 drive the intermediate transfer belt 17. A secondary transfer roller 19 is a roller for transferring (hereinafter referred to as "secondarily transferring") the toner image transferred on the intermediate transfer belt 17 to the sheet P, and a secondary transfer opposing roller 20 is a roller opposed to the secondary transfer roller 19. A fixing unit 21 melts and fixes the unfixed toner image transferred on the sheet P while conveying the sheet P. Delivery rollers 22 delivers the sheet P on which the fixing has been performed by the fixing unit 21 onto a tray 23.

Next, the image forming operation of the image forming apparatus 1 is described. When print data including print instructions and image information, for example, is input from a host computer (not shown), for example, to the controller 3, the image forming apparatus 1 starts a printing operation, and the sheet P is fed from the feed cassette 2 by the feed roller 4 and is delivered to a conveying path. Along with the operation in which the sheet P is fed, the photosensitive drums 8 are each charged to a certain potential by the charging roller 9. In accordance with the input print data, the optical unit 10 exposes and scans a surface of the charged photosensitive drum 8 with the laser beam to form the electrostatic latent image. In order to visualize the formed electrostatic latent image, the development is performed by the developing device 11, the developing roller 12, the developing blade 13, and the supply roller 14. The electrostatic latent images formed on the surfaces of the photosensitive drums 8 are developed as the toner images with the respective colors by the developing devices 11. The photosensitive drums 8 are in contact with the intermediate transfer belt 17, and rotate in synchronization with rotation of the intermediate transfer belt 17. The developed toner images of the respective colors are sequentially superimposed and transferred onto the intermediate transfer belt 17 by the primary transfer rollers 16Y, 16M, 16C, and 16K to form a color toner image. Then, the color toner image is secondarily transferred onto the sheet P by the secondary transfer roller 19 and the secondary transfer opposing roller 20. The toner image transferred onto the sheet P is fixed by the fixing unit 21 formed of fixing rollers, for example. The fixed sheet P is delivered onto the tray 23 by the delivery rollers 22, and the image forming operation ends. Members contributing to the image formation on the sheet P function as an image forming unit.

Power Source Apparatus

Figure 2A:
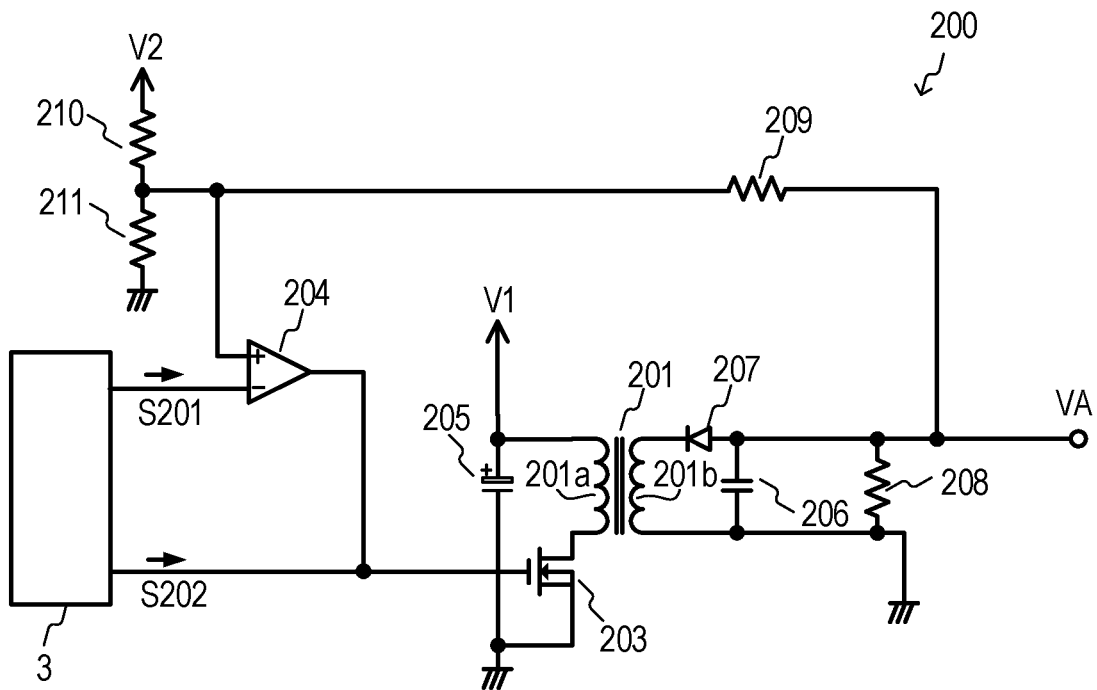
FIG. 2A is a diagram for illustrating a circuit example of a high voltage power source unit in the first embodiment.

FIG. 2A is a diagram for illustrating an example of a circuit of a high voltage power source unit 200 which is a power source apparatus according to the first embodiment. The high voltage power source unit 200 includes a transformer 201, an Nch field effect transistor (hereinafter referred to as "FET") 203, a comparator 204, an electrolytic capacitor 205, a ceramic capacitor 206, a diode 207, and fixed resistors 208 to 211. The transformer 201 includes a primary coil 201a and a secondary coil 201b. An input voltage is represented by V1, and a reference voltage is represented by V2.

Next, with reference to FIG. 2A, operation of the high voltage power source unit 200 is described. The FET 203, which is a switching element, is connected in series to the primary coil 201a of the transformer 201. The drive signal S202, which is a control signal, is a pulse signal transmitted from the controller 3, and is input to a gate terminal of the FET 203 in order to drive the transformer 201 by the FET 203. When the drive signal S202 is input to the gate terminal of the FET 203, the FET 203 performs a switching operation of being repeatedly turned on or off (hereinafter referred to as "on/off") depending on the duty and the frequency of the drive signal S202. When the FET 203 is turned on/off, a DC voltage across the electrolytic capacitor 205 is applied as a pulsed waveform to the primary coil 201a of the transformer 201. As a result, a negative voltage is generated by the secondary coil 201b of the transformer 201, the ceramic capacitor 206, and the diode 207. In other words, a stepped-up pulsed voltage having the same period is output from a secondary side of the transformer 201. The pulsed voltage output from the secondary side of the transformer 201 is rectified and smoothed by a rectifying and smoothing circuit formed of the diode 207 and the ceramic capacitor 206. Then, a high-voltage DC voltage VA (hereinafter also simply referred to as "output voltage"), which is an output voltage of the high voltage power source unit 200, appear across the ceramic capacitor 206.

The resistor 208 is a bleeder resistor for obtaining a stable output voltage. An input signal S201 is a signal for adjusting the DC voltage VA, which is transmitted from the controller 3, is a DC voltage corresponding to the DC voltage VA, and is hereinafter referred to as "target voltage signal S201." The target voltage signal S201 is input to a negative terminal (inverting input terminal) of the comparator 204. A voltage (hereinafter referred to as "feedback voltage") obtained by dividing the DC voltage VA by the resistor 209, the reference voltage V2, the resistor 210, and the resistor 211 is input to a positive terminal (non-inverting input terminal) of the comparator 204. An output terminal of the comparator 204 is connected to the gate terminal of the FET 203. When the output voltage is increased in absolute value, and the voltage input to the positive terminal of the comparator 204 becomes smaller than a target voltage input to the negative terminal, a voltage of the output terminal of the comparator 204 becomes a low level, and a gate voltage of the FET 203 becomes 0 V.

A state in which the output of the drive signal S202 is stopped in a predetermined period in which the voltage of the positive terminal of the comparator 204 is smaller than the target voltage of the negative terminal as described above is referred to as "state in which the drive signal S202 is decimated." When the drive signal S202 is decimated, the transformer 201 is stopped being driven, and hence the output voltage is reduced in absolute value. In this manner, when the feedback voltage (positive terminal) is lower than the target voltage signal S201 (negative terminal), the comparator 204 stops driving of the transformer 201 by the FET 203 irrespective of the drive signal S202. After that, when the feedback voltage (positive terminal) of the comparator 204 becomes larger than the target voltage signal S201 (negative terminal), the FET 203 restarts being turned on/off (switching operation) by the drive signal S202, and the output voltage is increased in absolute value again. Such an operation is repeated so that the output voltage is maintained at the target voltage. The comparator 204 functions as a stop unit which stops the input of the drive signal S202 to the FET 203 when an output voltage that is output from the secondary side of the transformer 201 exceeds the target voltage in absolute value.

Figure 2B:
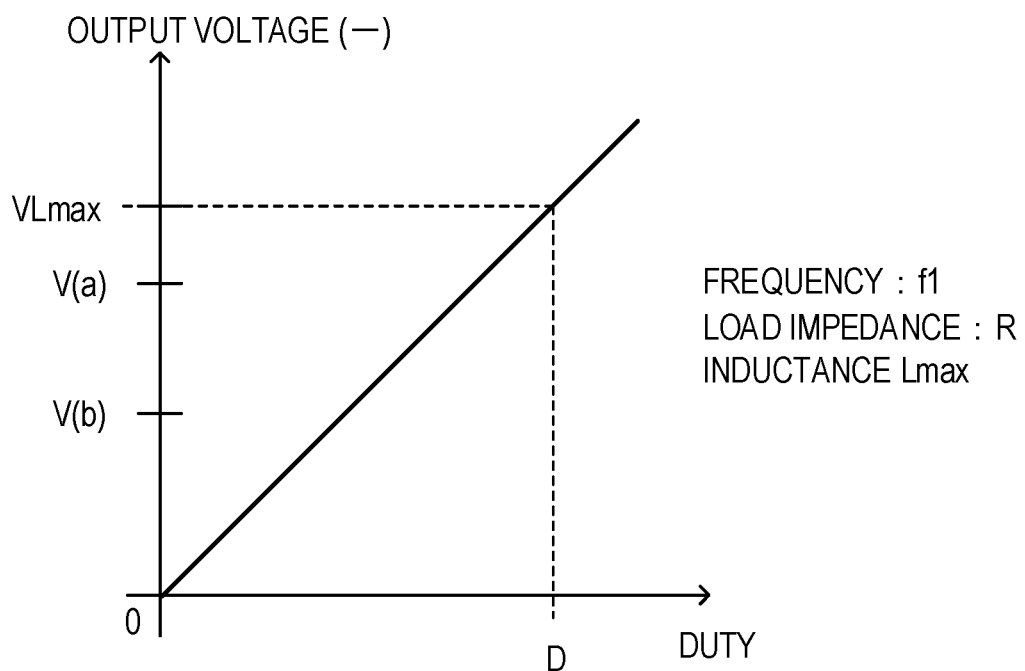
FIG. 2B is a graph for showing an output characteristic of a transformer.

The high voltage power source unit 200 of FIG. 2A performs the above-mentioned circuit operation, and hence a ripple is inevitably liable to occur in the output voltage (DC voltage VA). Further, the ripple in the output voltage is correlated with an output voltage as a target (above-mentioned target voltage, hereinafter referred to as "target output voltage"). FIG. 2B shows an output characteristic of the high voltage power source unit 200. In FIG. 2B, the horizontal axis represents an on-duty (duty) of the drive signal S202, and the vertical axis represents the output voltage (−) of the high voltage power source unit 200. The duty of the drive signal S202 may be an off-duty, and in this case, an inverse correlation is established. Here, as shown in FIG. 2B, in the output characteristic of the high voltage power source unit 200, as the on-duty of the drive signal S202 becomes larger, a negative output voltage becomes larger, in other words, the DC voltage VA is increased in absolute value. Description of f1, R, Lmax, V(a), and V(b) is given later.

Output Waveform of High Voltage Power Source Unit 200

FIG. 3A and FIG. 3B show output waveforms of the high voltage power source unit 200. The high voltage power source unit 200 can change the DC voltage VA by switching the target output voltage. FIG. 3A shows a waveform obtained when the target output voltage is V(a), and FIG. 3B shows a waveform obtained when the target output voltage is V(b). Further, a relationship between the target output voltage V(a) and the target output voltage V(b) is a relationship of the following equation (1).

$$|V(b)| < |V(a)| \quad (1)$$

In each of FIG. 3A and FIG. 3B, with the horizontal axis representing time, the waveform of the drive signal S202 is shown in Part (i), and the output voltage (DC voltage VA) of the high voltage power source unit 200 is shown in Part (ii). In Part (ii), the target output voltage (V(a) or V(b)) is indicated by the broken line.

From the output characteristic shown in FIG. 2B, when a frequency "f" of the drive signal S202 is represented by f1, and the on-duty is represented by D, a maximum output voltage of the high voltage power source unit 200 is VLmax. Here, in FIG. 2B, a load impedance is represented by R, and the transformer 201 having an L-value of Lmax is used. When the target output voltage is the target output voltage V(a), which is close to the maximum output voltage VLmax, as shown by the waveform of FIG. 3A, the drive signal S202 is less decimated, and hence the ripple in the output voltage is small. Meanwhile, when the target output voltage is the target output voltage V(b), which is lower than the target output voltage V(a), as shown by the waveform of FIG. 3B, the drive signal S202 is more decimated than in FIG. 3A, and the ripple in the output voltage becomes larger.

In other words, in order to suppress the ripple in the output voltage, it is only required to adjust the frequency "f" and the on-duty D of the drive signal S202 so as to reduce a difference between the output voltage of the high voltage power source unit 200 and the target output voltage. Ideally, it is preferred to make the output voltage and the target output voltage equal to each other so as to drive under a state in which the drive signal S202 is not decimated.

When Applied for Generating Charging Voltage

Next, description is given of a sequence to be performed when the high voltage power source unit 200 is applied to the charging voltage. When the output voltage is used as the charging voltage, the charging voltage is generally output as a fixed voltage. However, in order to follow a change in density of the image due to an increase in temperature, for example, which occurs during continuous printing, the output voltage may be changed depending on a plurality of conditions such as the number of prints and the temperature in some cases. However, when the on-duty of the drive signal S202 is switched under a state in which the output voltage is applied during one job of performing the continuous printing, the following problem occurs. Specifically, the ripple may be generated in the output voltage at the time of switching, or power consumption of the FET 203 to be turned on/off with the drive signal S202 may be increased. Consequently, it is desired to avoid changing the duty of the drive signal S202 during one job. Thus, in a range in which the ripple in the output voltage is smaller than an allowable output ripple Y, which is to be described later, the controller 3 changes the output voltage using one duty without switching the duty. As described above, the output voltage is changed using one duty through adjustment of an amount of decimation of the drive signal S202 by the comparator 204. As a result, the output voltage can be made to approach the target voltage.

Figure 4A:
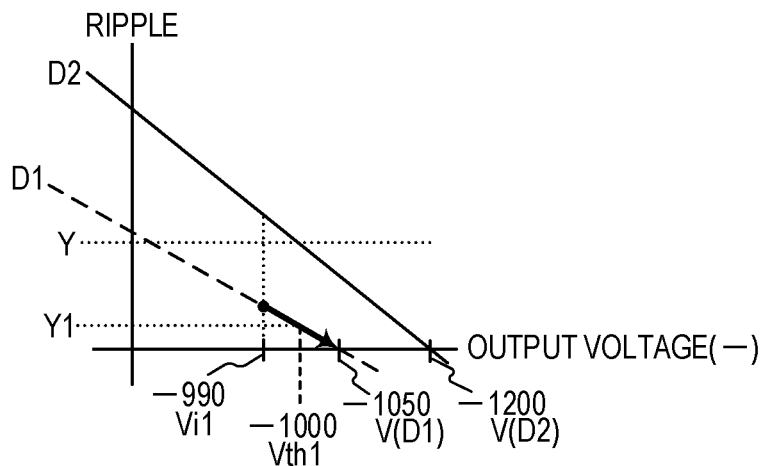
FIG. 4A, FIG. 4B, and FIG. 4C are graphs for showing a method of varying an output voltage of the high voltage power source unit in the first embodiment.
Figure 4B:
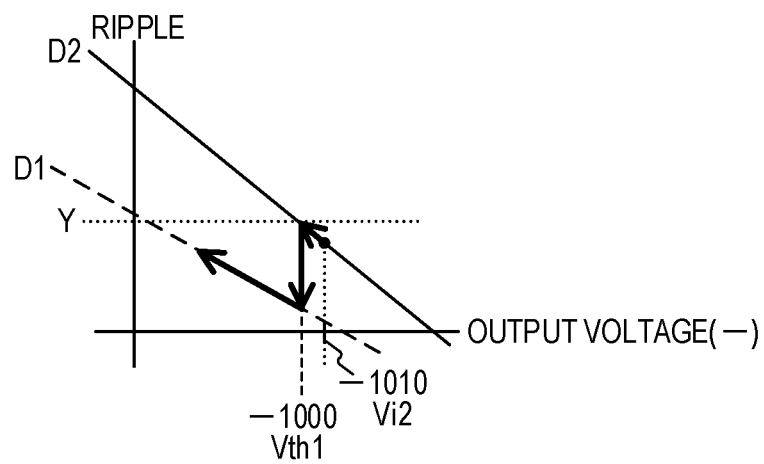
Figure 4C:
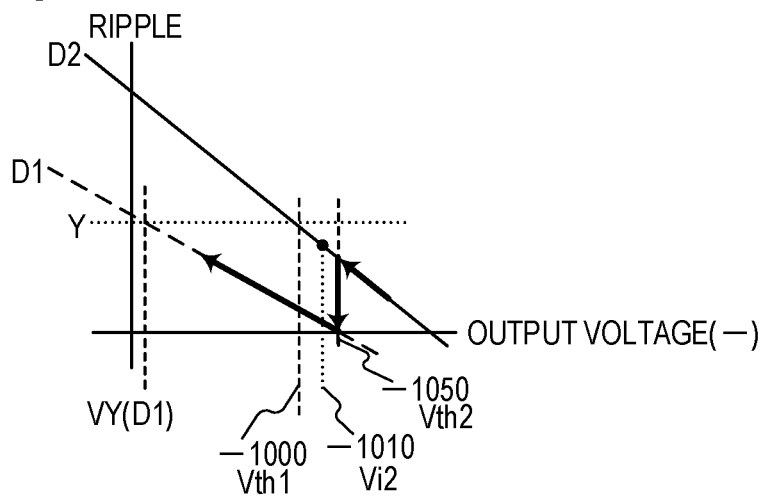

FIG. 4A, FIG. 4B, and FIG. 4C are graphs for showing a relationship between the output voltage (−) and the ripple. The horizontal axis represents the output voltage (−). The vertical axis represents the ripple in the output voltage. Description is given of operation performed when the on-duty of the drive signal S202 is switched at a predetermined output voltage. Here, a threshold value of the output voltage for setting the duty is defined as the threshold value Vth1. As an example, an output voltage at the beginning (hereinafter referred to as "initial output voltage") Vi1 is −990 V, an initial output voltage Vi2 is −1,010 V, and the threshold value Vth1 is −1,000 V. A characteristic obtained when the duty of the drive signal S202 is D1 is indicated by the broken line, and a characteristic obtained when the duty is D2 is indicated by the solid line.

A limit of the output voltage at the duty D1, which is a first duty, is an output voltage V(D1). Meanwhile, a limit of the output voltage at the duty D2, which is a second duty, is an output voltage V(D2), and the duties have a relationship of D1<D2. An absolute value of the maximum value (V(D2)) of the output voltage that is output in accordance with the duty D2 is larger than an absolute value of the maximum value (V(D1)) of the output voltage that is output in accordance with the duty D1. As an example, the output voltage V(D1) is −1,050 V, and the output voltage V(D2) is −1,200 V. For each of the duties D1 and D2, as the output voltage becomes larger (in absolute value), the ripple also becomes smaller. Further, a ripple (Y of FIG. 4A) generated when a predetermined output voltage (for example, −1,000 V) is output in accordance with the duty D2 is larger than a ripple Y1 generated when an output voltage that is substantially the same as the predetermined output voltage is output in accordance with the duty D1 (Y>Y1).

When Output Voltage is to be Made Larger than Initial Output Voltage

With reference to FIG. 4A, a sequence of increasing the output voltage (in absolute value) with the initial output voltage Vi1 being −990 V is described. An allowable ripple (hereinafter referred to as "allowable output ripple") in the output voltage is represented by Y, and is indicated by the dotted line. When the ripple in the output voltage becomes larger than the allowable output voltage ripple Y, the output voltage is unstable, and there is a fear in that an image defect may occur. The threshold value Vth1 is an output voltage obtained when the FET 203 is turned on or off at the duty D2 of the drive signal S202 at which the ripple in the output voltage becomes an allowable maximum ripple, that is, the allowable output voltage ripple Y. Thus, when the initial output voltage Vi1 is −990 V, the generated ripple exceeds the allowable output voltage ripple Y, and hence driving cannot be performed with the drive signal S202 at the duty of D2. With the initial output voltage Vi1 (−990 V) being smaller than the threshold value Vth1 (−1,000 V), driving is performed with the drive signal S202 at the duty of D1. In this case, the generated ripple becomes equal to or smaller than the allowable output voltage ripple Y. The target voltage signal S201 is changed (switched) therefrom to increase the output voltage, which can be changed up to the output voltage V(D1) (−1,050 V), which is the limit of the output voltage at the duty D1 of the drive signal S202.

In other words, when the output voltage is to be increased from the initial output voltage Vi1, the generated ripple is maintained equal to or smaller than the allowable output voltage ripple Y, and hence the controller 3 can change the output voltage in a range of from −990 V to −1,050 V without changing the duty D1. When the output voltage at the beginning is equal to or larger than the threshold value Vth1 (equal to or larger than the threshold value), and the output voltage is to be increased, the output voltage is increased without changing the duty D2. The threshold value Vth1 of FIG. 4A can also be said to be a threshold value for setting an initial duty corresponding to the output voltage at the beginning.

When Output Voltage is to be Made Smaller than Initial Output Voltage

Next, with reference to FIG. 4B, a sequence of reducing the output voltage (in absolute value) with the initial output voltage Vi2 being −1010 V is described. With the initial output voltage Vi2 (−1,010 V) being larger than the threshold value Vth1 (−1,000 V), driving is first performed with the drive signal S202 at the duty of D2. The target voltage signal S201 is changed therefrom to reduce the output voltage, which can be changed up to the output voltage of −1,000 V at which the allowable output voltage ripple Y at the duty D2 of the drive signal S202 is generated. However, in changing the output voltage, when the output voltage becomes lower than the threshold value Vth1, the ripple exceeds the allowable output voltage ripple Y without changing the duty D2, and hence the controller 3 switches the duty to the duty D1 at the threshold value Vth1.

Then, in FIG. 4B, the range in which the output voltage can be changed at the duty D2 is only 10 V from the initial output voltage Vi2 (−1,010 V) to the allowable output voltage ripple Y. In other words, a variable range of the output voltage is only 10 V. To address this problem, in a sequence of reducing the output voltage, the duty of the drive signal S202 is switched at the boundary of the threshold value Vth2 which is larger (in absolute value) than the threshold value Vth1 (|Vth2|>|Vth1|). In other words, the controller 3 adopts a different predetermined threshold value for the case of increasing the output voltage from the output voltage at the beginning and for the case of reducing the output voltage from the output voltage at the beginning. With reference to FIG. 4C, a sequence of reducing the output voltage with the initial output voltage Vi2 being −1,010 V in the first embodiment is described. In FIG. 4C, the output voltage V(D1) (−1,050 V), which is the limit of the output voltage at the duty D1 of the drive signal S202, is set as the threshold value Vth2.

With the initial output voltage Vi2 (−1,010 V) being smaller than the threshold value Vth2 (−1,050 V) (Vi2<Vth2 (=V(D1))), driving is performed with the drive signal S202 at the duty of D1. The target voltage signal S201 is changed therefrom to reduce the output voltage, which can be changed up to an output voltage VY(D1) at which the allowable output voltage ripple Y at the duty D1 of the drive signal S202 is generated. At this time, the range in which the output voltage can be changed is a difference between the initial output voltage Vi2 and the output voltage VY(D1), which is larger than 10 V in the example of FIG. 4B (|Vi2|−|VY(D1)|>|Vi2|−|Vth1|).

As described above, in the sequence of reducing the output voltage, the duty is switched using the threshold value Vth2(>Vth1), which is a second threshold value that is different from the threshold value Vth1, which is a first threshold value of the output voltage in the sequence of increasing the output voltage. In this manner, with the duty being set depending on the output voltage at the beginning and the threshold value Vth2, while the output voltage can be changed only within the range of 10 V of FIG. 4B, the following result can be obtained in FIG. 4C. Specifically, the output voltage can be changed significantly with one duty without switching the duty. When the output voltage at the beginning is larger than the threshold value Vth2, and the output voltage is to be reduced, the operation is performed first at the duty D2, and then a switch is made from the duty D2 to the duty D1 at the threshold value Vth2 to reduce the output voltage.

As described above, the threshold value Vth1 for use in the sequence of increasing the voltage and the threshold value Vth2 for use in the sequence of reducing the voltage are set to different values. As a result, an optimal duty of the drive signal S202 can be selected in the sequence of increasing the output voltage and in the sequence of reducing the output voltage depending on the output voltage at the beginning.

In Regard to Switching of Frequency

Figure 5A:
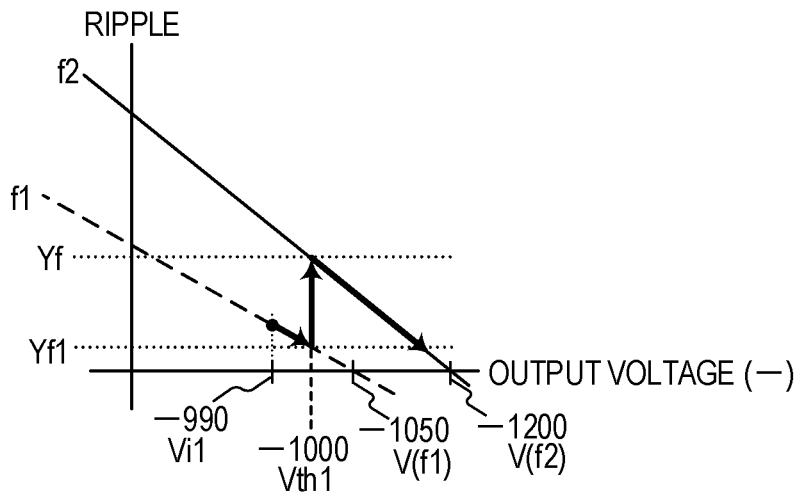
FIG. 5A, FIG. 5B, and FIG. 5C are graphs for showing a method of varying the output voltage of the high voltage power source unit in the first embodiment.
Figure 5B:
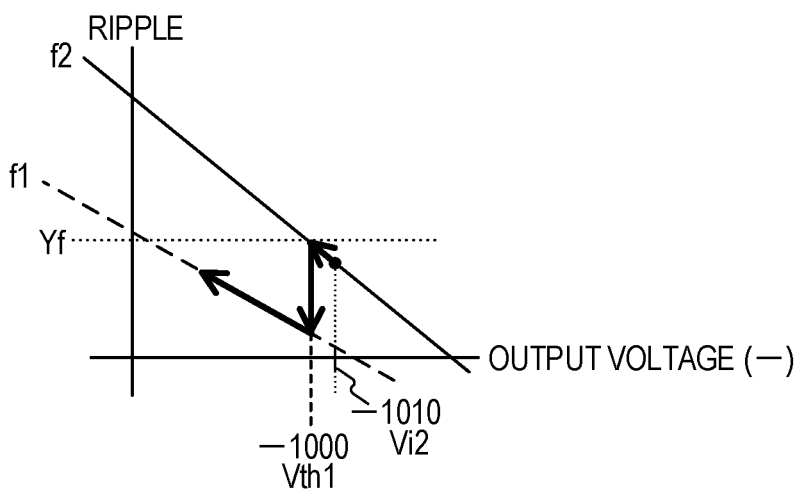
Figure 5C:
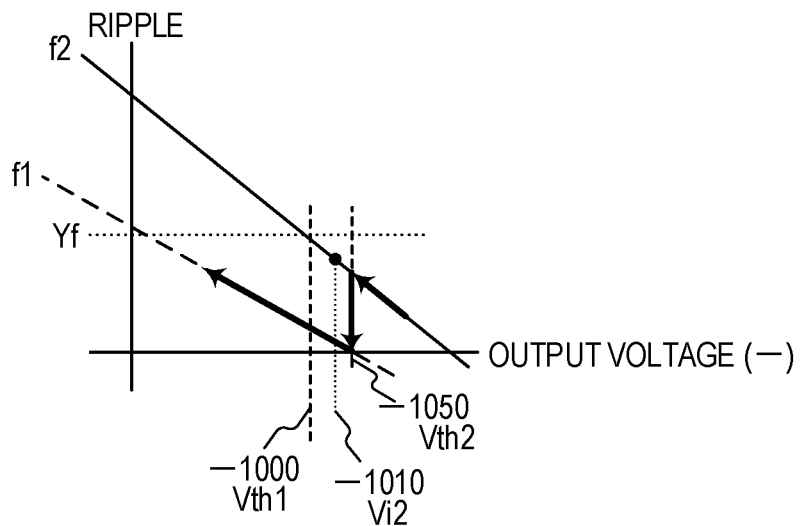

Also, when the frequency is switched, operation similar to the operation performed when the duty is switched is performed. FIG. 5A, FIG. 5B, and FIG. 5C are graphs for showing relationships between the output voltage (−) and the ripple. The horizontal axis represents the output voltage (−). The vertical axis represents the ripple in the output voltage. Description is given of the operation performed when the frequency of the drive signal S202 is switched at the predetermined output voltage.

A limit of the output voltage at a frequency f1, which is a first frequency, is an output voltage V(f1). Meanwhile, a limit of the output voltage at a frequency f2, which is a second frequency, is an output voltage V(f2), and the frequencies have a relationship of f1<f2. An absolute value of the maximum value (V(f2)) of the output voltage that is output in accordance with the frequency f2 is larger than an absolute value of the maximum value (V(f1)) of the output voltage that is output in accordance with the frequency f1. As an example, the output voltage V(f1) is −1,050 V, and the output voltage V(f2) is −1,200 V. For each of the frequencies f1 and f2, as the output voltage becomes larger (in absolute value), the ripple also becomes smaller. Further, a ripple (Yf of FIG. 5A) generated when a predetermined output voltage (for example, −1,000 V) is output in accordance with the frequency f2 is larger than a ripple Yf1 generated when an output voltage that is substantially the same as the predetermined output voltage is output in accordance with the frequency f1 (Yf>Yf1).

As shown in FIG. 5A, FIG. 5B, and FIG. 5C, when the frequency is switched, in the same manner as when the duty is switched, the threshold value Vth1 for use in the sequence of increasing the voltage and the threshold value Vth2 for use in the sequence of reducing the voltage are set to different values. As a result, an optimal frequency of the drive signal S202 can be selected in the sequence of increasing the output voltage and in the sequence of reducing the output voltage depending on the output voltage at the beginning.

Further, the charging voltage is described as an example in the first embodiment, but the present invention is not limited to the charging voltage.

Further, the image forming apparatus 1 to which the high voltage power source unit 200 in the first embodiment is applicable is also not limited to the configuration illustrated in FIG. 1. Still further, it is not always required that the control unit which outputs the drive signal to the FET 203 be the controller 3. The control unit may be a control unit included separately from the controller 3 in the high voltage power source unit 200.

As described above, according to the first embodiment, in the power source apparatus capable of changing the output voltage, the generation of the ripple in the output voltage and the power consumption can be reduced.

Second Embodiment

In the first embodiment, irrespective of a load of the output voltage (DC voltage VA), the threshold value of the output voltage for switching the duty of the drive signal S202 is set depending on whether the sequence is to increase the output voltage or reduce the output voltage from the initial output voltage. Those configurations are on the premise of being not affected by a load of the image forming apparatus 1. For example, the load of the photosensitive drums 8 in the case of the charging process and the load of the primary transfer rollers 16 in the case of the transfer process are determined. However, resistance values of the loads vary depending on variations in parts, environmental temperature and humidity, and a moisture absorption state of paper (sheet P), for example, and hence a design that takes in consideration such variations in resistance values of the loads is required. To address this problem, in a second embodiment, a configuration in which the first threshold value and/or the second threshold value is switched is adopted. Specifically, description is given of a method of setting the drive signal S202 to an appropriate drive condition by monitoring a load current with use of a load current detection circuit and then changing the threshold value of the output voltage.

Power Source Apparatus

Figure 6:
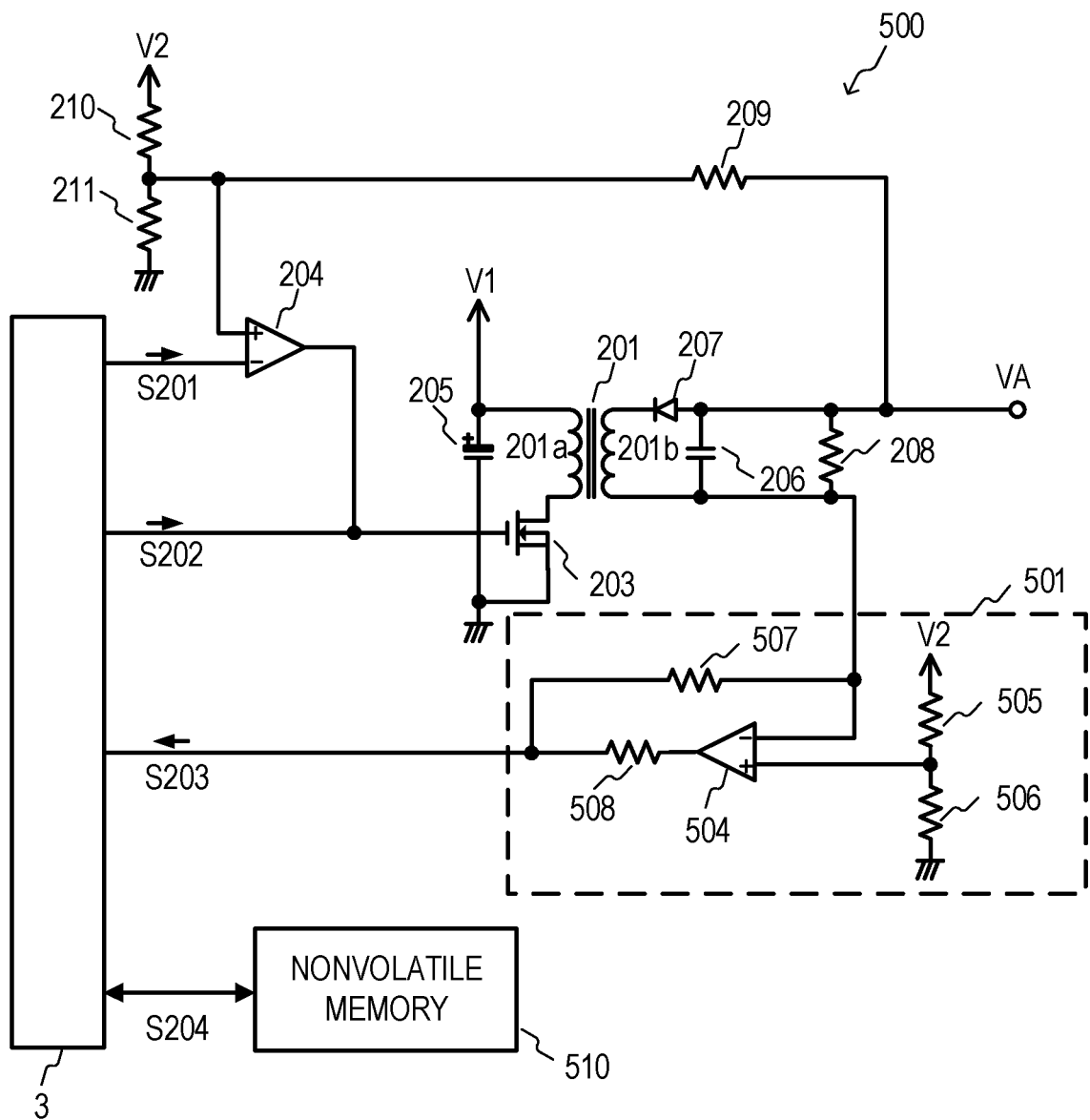
FIG. 6 is a diagram for illustrating a circuit example of a high voltage power source unit in the second embodiment.

FIG. 6 shows an example of a circuit of a high voltage power source unit 500 which is a power source apparatus according to the second embodiment. Like reference symbols, operations of the transformer 201 and the comparator 204, and the image forming apparatus 1 are similar to those in the first embodiment, and hence description thereof is omitted. A load current detection circuit 501, which is a detection unit which detects an electric current flowing through the loads, is described. In the second embodiment, the controller 3 changes the second threshold value based on a result of the detection by the load current detection circuit 501. The load current detection circuit 501 includes an operational amplifier 504 and resistors 505 to 508.

An electric current flowing on the secondary side of the transformer 201 is supplied from the high voltage power source unit 500 to the loads of the image forming apparatus 1, passes from a GND (not shown) of the operational amplifier 504 through the resistor 508 and the resistor 507, and returns to the transformer 201. Thus, the load current can be calculated based on a voltage difference between both ends of the resistor 507. A negative terminal of the operational amplifier 504 has the same voltage as that of a positive terminal of the operational amplifier 504.

The positive terminal of the operational amplifier 504 is determined by the reference voltage V2, the resistor 505, and the resistor 506, and hence is known. The load current detection circuit 501 outputs a current detection signal S203, and the current detection signal S203 is input to an AD port of the controller 3. Thus, the controller 3 can calculate the load current based on the known voltage and the voltage difference between both ends of the resistor 507.

Incidentally, as described in the first embodiment, the DC voltage VA, which is the output voltage generated by driving the transformer 201 by the switching operation of the FET 203, is supplied to the resistor 209, the resistor 208, and the load. Thus, when the load current is increased or reduced, the electric current supplied from the transformer 201 is controlled to be increased or reduced by the comparator 204, and the decimation of the drive signal S202 by the comparator 204 is increased or reduced. With the decimation by the comparator 204 being increased or reduced by the load current, when the load current is changed significantly, the relationship between the output voltage and the ripple in the output voltage is also changed. For example, in the case of the photosensitive drum 8 to which the charging voltage is applied, the load current is initially large because a thickness of a film formed on the surface of the photosensitive drum 8 is initially large, but when the surface of the photosensitive drum 8 is abraded along with the use, the thickness of the film is reduced, and the load current is reduced. Those currents can be calculated before the image forming process (for example, at startup of the image forming apparatus).

RELATIONSHIP BETWEEN LOAD CURRENT AND RIPPLE

Figure 7A:
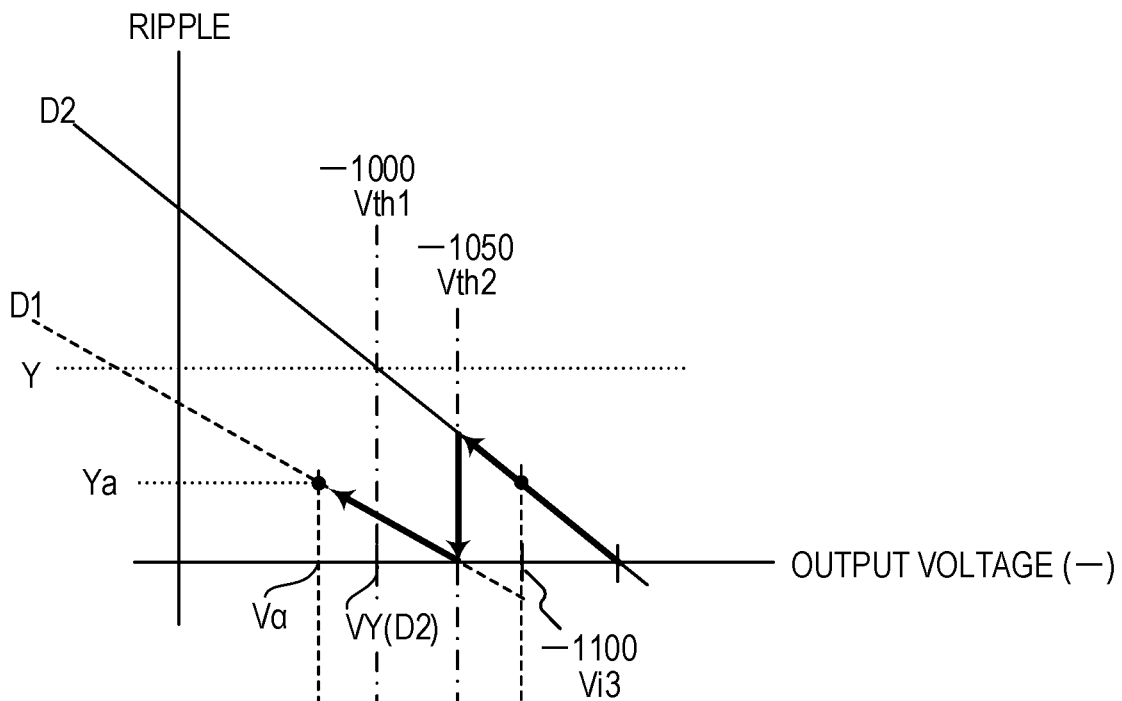
FIG. 7A and FIG. 7B are graphs for showing a method of varying an output voltage of the high voltage power source unit in the second embodiment.
Figure 7B:
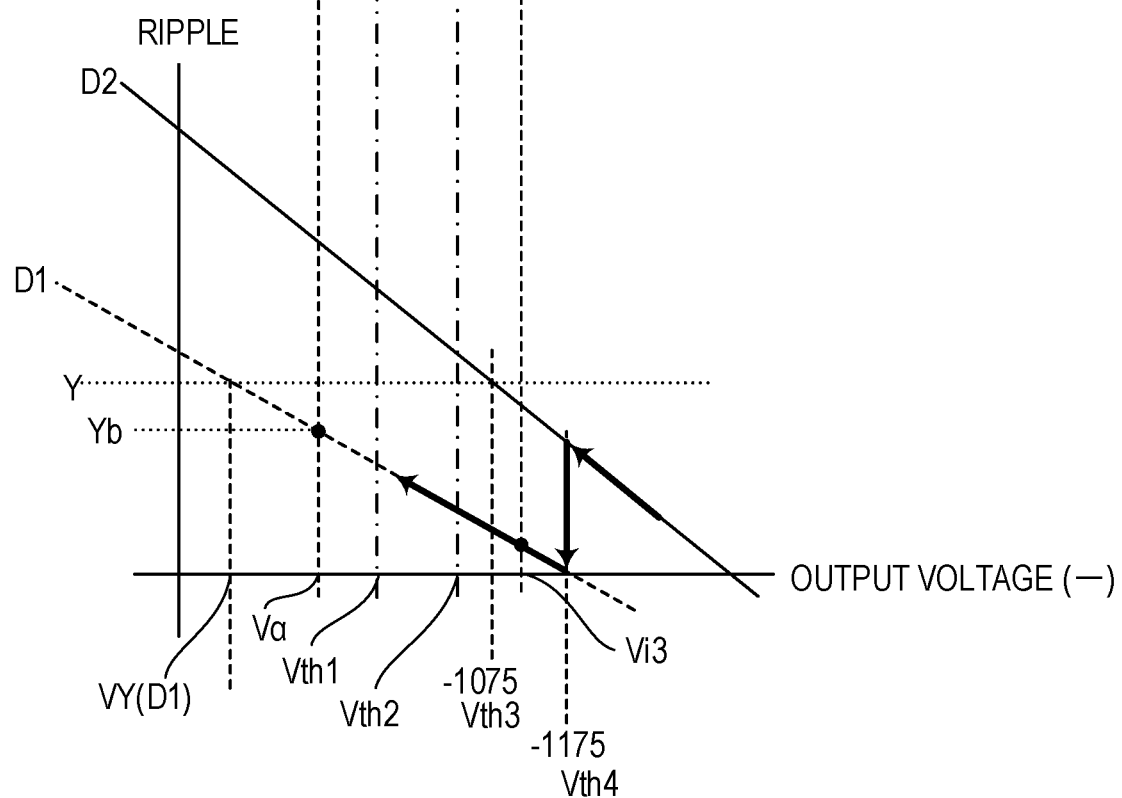

Next, sequences of reducing the output voltage are described with reference to FIG. 7A and FIG. 7B. FIG. 7A shows a relationship between the output voltage (−) and the ripple obtained when the load current is large, and FIG. 7B shows the relationship obtained when the load current is small, for the duty D1 (broken line) and the duty D2 (solid line) as in the first embodiment. The graphs of FIG. 7A and FIG. 7B are similar to the graphs of FIG. 4A, FIG. 4B, and FIG. 4C.

When the load current detected by the load current detection circuit 501 is large, as shown in FIG. 7A, a ripple generated when a predetermined output voltage Vα is output at the duty D1 is Ya. When the load current detected by the load current detection circuit 501 is small, as shown in FIG. 7B, a ripple generated when the predetermined output voltage Vα is output at the duty D1 is Yb. In this manner, with the same duty and the same output voltage, as the load current becomes larger, the ripple in the output voltage becomes smaller (Ya<Yb).

In the Case of Reducing Output Voltage from Initial Output Voltage

Next, a sequence of reducing the output voltage from an initial output voltage Vi3 is described. When the load current is large, a threshold value for use in a sequence of increasing the output voltage is represented by Vth1, and a threshold value for use in the sequence of reducing the output voltage is represented by Vth2. Further, when the load current is small, a threshold value for use in the sequence of increasing the output voltage is represented by Vth3, and a threshold value for use in the sequence of reducing the output voltage is represented by Vth4. The same applies also in FIG. 8A and FIG. 8B. As an example, the initial output voltage Vi3 is −1,100 V, the threshold value Vth1 is −1,000 V, and the threshold value Vth2 (|Vth2|>|Vth1|) is −1,050 V. Further, the threshold value Vth3 is −1,075 V (|Vth3|>|Vth2|), and the threshold value Vth4 is −1,175 V (|Vth4|>|Vth3|). In the following description, the phrase "the load current is large" means, for example, a case in which the load current is larger than a predetermined value, and the phrase "the load current is small" means, for example, a case in which the load current is equal to or smaller than the predetermined value.

When Load Current is Large

When the load current is large, as shown in FIG. 7A, the initial output voltage Vi3 (−1,100 V) is larger in absolute value than the threshold value Vth2 (−1,050 V), and hence the operation is performed at the duty D2. The target voltage signal S201 is changed therefrom to reduce the output voltage, and a switch is made from the duty D2 to the duty D1 at the threshold value Vth2 to reduce the output voltage. The output voltage may be reduced without switching the duty from the duty D2 at the threshold value Vth2. In this case, the output voltage may be changed up to an output voltage VY(D2) at which the allowable output voltage ripple Y at the duty D2 of the drive signal S202 is generated. When the output voltage at the beginning is smaller than the threshold value Vth2, and the output voltage is to be reduced, the operation is performed at the duty D1, and the output voltage is reduced without changing the duty D1.

When Load Current is Small

When the load current is small, a characteristic as shown in FIG. 7B is obtained. Specifically, when the load current is small, the output voltage at which the allowable output voltage ripple Y is generated when the duty of the drive signal S202 is set to D2 is, for example, −1,075 V. The initial output voltage Vi3 is larger than the threshold value Vth2 (−1,050 V), and hence when the operation is performed at the duty D2, the output voltage can be changed only by 25 V until −1,075 V (=Vth3) at which the allowable output voltage ripple Y at the duty D2 is generated. In other words, when the load current is small, and when the duty is set to D2, a variable range of the output voltage is only 25 V. In view of this, in the second embodiment, when the load current is small, as shown in FIG. 7B, the duty is switched at the boundary of the threshold value Vth4 (−1,175 V). In other words, the initial output voltage Vi3 (−1,100 V) is smaller than the threshold value Vth4 (−1,175 V), and hence the operation is performed at the duty D1. In this manner, the voltage can be varied significantly up to the voltage VY(D1) at which the allowable output voltage ripple Y at the duty D1 for use when the load current is small is generated. At this time, the range in which the output voltage can be varied is a difference between the initial output voltage Vi3 and the output voltage VY(D1), and is larger than 25 V (|Vi3|−|VY(D1)|>|Vi3|−|Vth3|). When the output voltage at the beginning is larger than the threshold value Vth4, and the output voltage is to be reduced, the operation is first performed at the duty D2, and a switch is made from the duty D2 to the duty D1 at the threshold value Vth4 to reduce the output voltage.

As described above, in the case of reducing the output voltage from the output voltage at the beginning, the controller 3 performs the following control based on the result of the detection by the load current detection circuit 501. Specifically, when the electric current detected by the load current detection circuit 501 is equal to or smaller than the predetermined value, the controller 3 sets the threshold value for switching the duty to a threshold value Vth4 which is a third threshold value. Here, the threshold value Vth4 is larger than the threshold value Vth2 which is the second threshold value for switching the duty when the electric current detected by the load current detection circuit 501 is larger than the predetermined value.

In the Case of Increasing Output Voltage from Initial Output Voltage

Figure 8A:
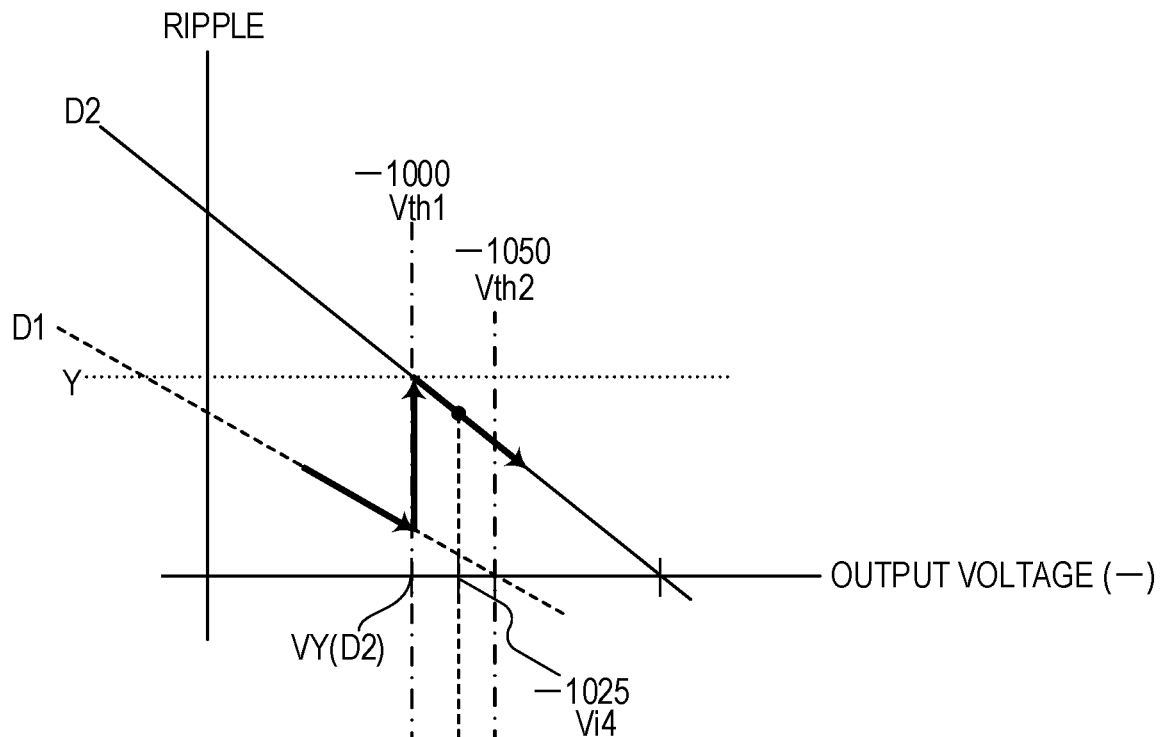
FIG. 8A and FIG. 8B are graphs for showing a method of varying the output voltage of the high voltage power source unit in the second embodiment.
Figure 8B:
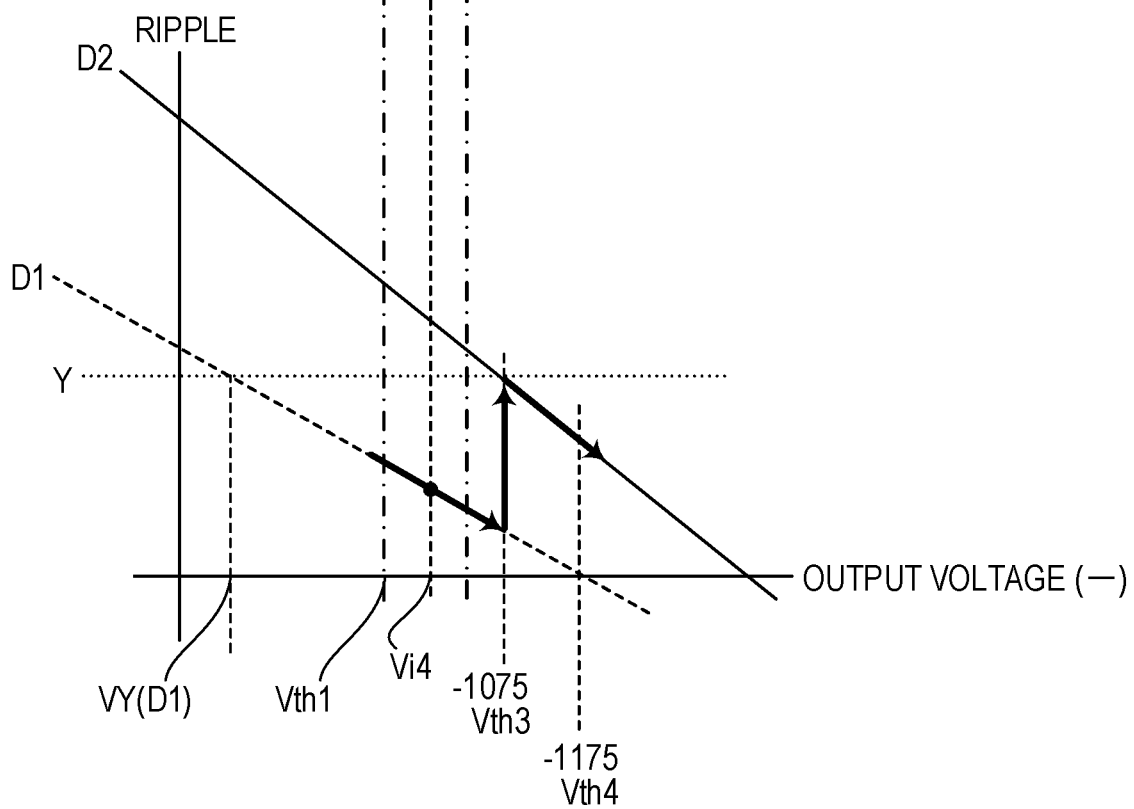

Next, sequences of increasing the output voltage are described with reference to FIG. 8A and FIG. 8B. FIG. 8A shows a relationship between the output voltage and the ripple obtained when the load current is large, and FIG. 8B shows the relationship obtained when the load current is small, for the duty D1 (broken line) and the duty D2 (solid line) as in the first embodiment. Next, a sequence of increasing the output voltage from an initial output voltage Vi4 is described. As an example, the initial output voltage Vi4 is −1,025 V.

When Load Current is Large

When the load current is large, as shown in FIG. 8A, the initial output voltage Vi4 (−1,025 V) is larger than the threshold value Vth1 (−1,000 V), and hence the operation is performed at the duty D2. The target voltage signal S201 is changed therefrom to increase the output voltage, which can be changed up to the output voltage which is the output capacity limit at the duty D2 of the drive signal S202. When the output voltage at the beginning is smaller than the threshold value Vth1, and the output voltage is to be increased, the operation is performed first at the duty D1, and a switch is made from the duty D1 to the duty D2 at the threshold value Vth1 to increase the output voltage. Further, when the output voltage is increased without changing the duty D1, the generated ripple is maintained equal to or smaller than the allowable output voltage ripple Y, and hence the switch to the duty D2 may not be made.

When Load Current is Small

When the load current is small, a characteristic as shown in FIG. 8B is obtained. With the initial output voltage Vi4 being larger than the threshold value Vth1 (−1,000 V), the operation at the duty D2 leads to a state in which the ripple in the output voltage exceeds the allowable output voltage ripple Y at the duty D2, and there is a fear in that an image defect may occur. To address this problem, in the second embodiment, when the load current is small, as shown in FIG. 8B, the duty is switched at the boundary of the threshold value Vth3 (−1,075 V) (>Vth1). In other words, with the initial output voltage Vi4 (−1,025 V) being smaller than the threshold value Vth3 (−1,075 V), the operation is performed at the duty D1. Then, the output voltage is increased, and when the threshold value Vth3 is reached, a switch can be made from the duty D1 to the duty D2 to change the output voltage up to an output limit voltage at the duty D2. The output voltage may be changed up to the output limit voltage at the duty D1 when the load current is small without switching the duty from the duty D1 at the threshold value Vth3, and the voltage can be changed over a wide range.

As described above, in the case of increasing the output voltage from the output voltage at the beginning, the controller 3 performs the following control based on the result of the detection by the load current detection circuit 501. Specifically, when the electric current detected by the load current detection circuit 501 is equal to or smaller than the predetermined value, the controller 3 sets the threshold value for switching the duty to the threshold value Vth3 which is a fourth threshold value. Here, the threshold value Vth3 is larger than the threshold value Vth1 which is the first threshold value for switching the duty when the electric current detected by the load current detection circuit 501 is larger than the predetermined value.

As described above, in addition to the sequence of increasing or reducing the output voltage from the initial output voltage, the threshold value for switching the duty of the drive signal S202 is changed depending on the load current. As a result, when the load current has been changed significantly, the optimal duty of the drive signal S202 can be set for each case.

In Regard to Switching of Frequency

Also, when the frequency is switched, operation similar to the operation performed when the duty is switched is performed. FIG. 9A, FIG. 9B, FIG. 10A, and FIG. 10B are graphs for showing relationships between the output voltage (−) and the ripple. The horizontal axis represents the output voltage (−). The vertical axis represents the ripple in the output voltage.

In the Case of Reducing Output Voltage from Initial Output Voltage

Figure 9A:
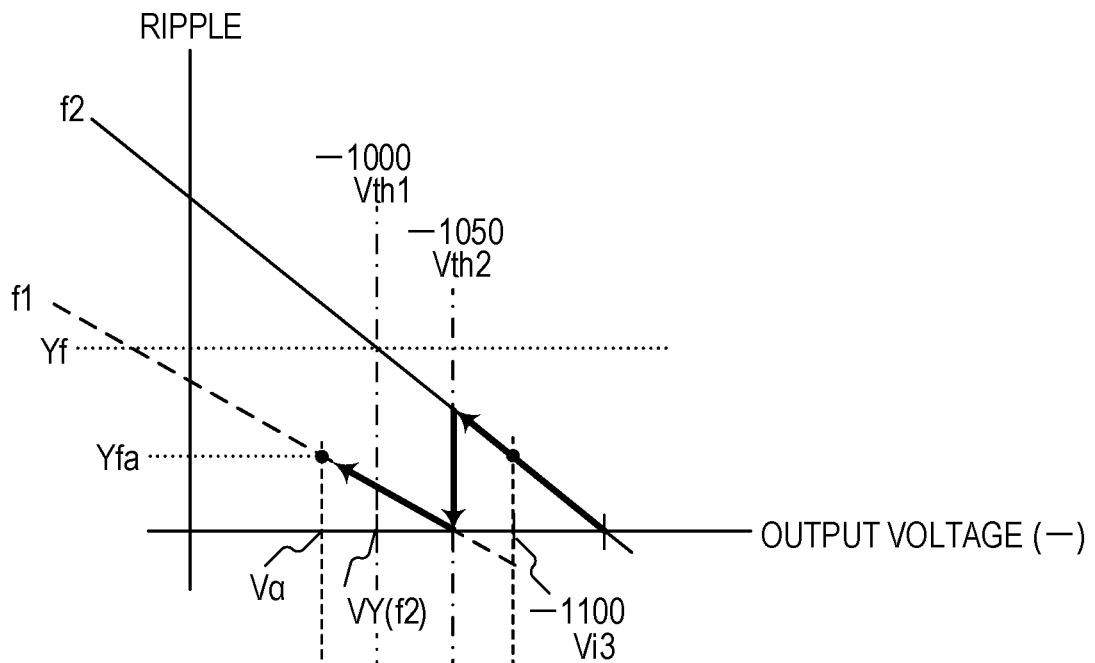
FIG. 9A and FIG. 9B are graphs for showing a method of varying the output voltage of the high voltage power source unit in the second embodiment.
Figure 9B:
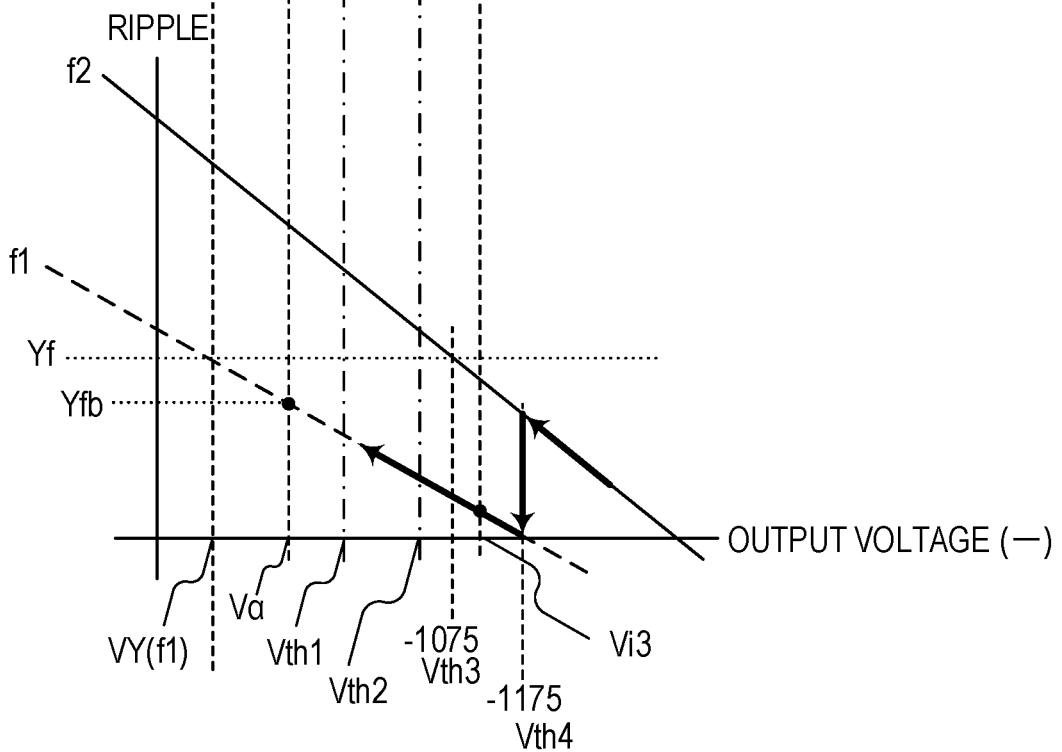

Next, sequences of reducing the output voltage from the initial output voltage Vi3 are described with reference to FIG. 9A and FIG. 9B. FIG. 9A shows a relationship between the output voltage (−) and the ripple obtained when the load current is large, and FIG. 9B shows the relationship obtained when the load current is small, for the frequency f1 (broken line) and the frequency f2 (solid line).

When Load Current is Large

When the load current is large, as shown in FIG. 9A, the initial output voltage Vi3 (−1,100 V) is larger in absolute value than the threshold value Vth2 (−1,050 V), and hence the operation is performed at the frequency f2. The target voltage signal S201 is changed therefrom to reduce the output voltage, and a switch is made from the frequency f2 to the frequency f1 at the threshold value Vth2 to reduce the output voltage. The output voltage may be reduced without switching the frequency from the frequency f2 at the threshold value Vth2. In this case, the output voltage may be changed up to an output voltage VY(f2) at which the allowable output voltage ripple Yf at the frequency f2 of the drive signal S202 is generated. When the output voltage at the beginning is smaller than the threshold value Vth2, and the output voltage is to be reduced, the operation is performed at the frequency f1, and the output voltage is reduced without changing the frequency f1.

When Load Current is Small

When the load current is small, a characteristic as shown in FIG. 9B is obtained. Specifically, when the load current is small, the output voltage at which the allowable output voltage ripple Yf is generated when the frequency of the drive signal S202 is set to f2 is, for example, −1,075 V. The initial output voltage Vi3 is larger than the threshold value Vth2 (−1,050 V), and hence when the operation is performed at the frequency f2, the output voltage can be changed only by 25 V until −1,075 V (=Vth3) at which the allowable output voltage ripple Yf at the frequency f2 is generated. In other words, when the load current is small, and when the frequency is set to f2, a variable range of the output voltage is only 25 V. In view of this, when the load current is small, as shown in FIG. 9B, the frequency is switched at the boundary of the threshold value Vth4 (−1,175 V). In other words, the initial output voltage Vi3 (−1,100 V) is smaller than the threshold value Vth4 (−1,175 V), and hence the operation is performed at the frequency f1. In this manner, the voltage can be varied significantly up to the voltage VY(f1) at which the allowable output voltage ripple Yf at the frequency f1 for use when the load current is small is generated. At this time, the range in which the output voltage can be varied is a difference between the initial output voltage Vi3 and the output voltage VY(f1), and is larger than 25 V (|Vi3|−|VY(f1)|>|Vi3|−|Vth3|).

When the output voltage at the beginning is larger than the threshold value Vth4, and the output voltage is to be reduced, the operation is first performed at the frequency f2, and a switch is made from the frequency f2 to the frequency f1 at the threshold value Vth4 to reduce the output voltage.

As described above, in the case of reducing the output voltage from the output voltage at the beginning, the controller 3 performs the following control based on the result of the detection by the load current detection circuit 501. Specifically, when the electric current detected by the load current detection circuit 501 is equal to or smaller than the predetermined value, the controller 3 sets the threshold value for switching the frequency to a threshold value Vth4 which is a third threshold value. Here, the threshold value Vth4 is larger than the threshold value Vth2 which is the second threshold value for switching the frequency when the electric current detected by the load current detection circuit 501 is larger than the predetermined value. A ripple Yfa of FIG. 9A and a ripple Yfb of FIG. 9B correspond to the ripple Ya of FIG. 7A and the ripple Yb of FIG. 7B, respectively, and description thereof is omitted.

In the Case of Increasing Output Voltage from Initial Output Voltage

Figure 10A:
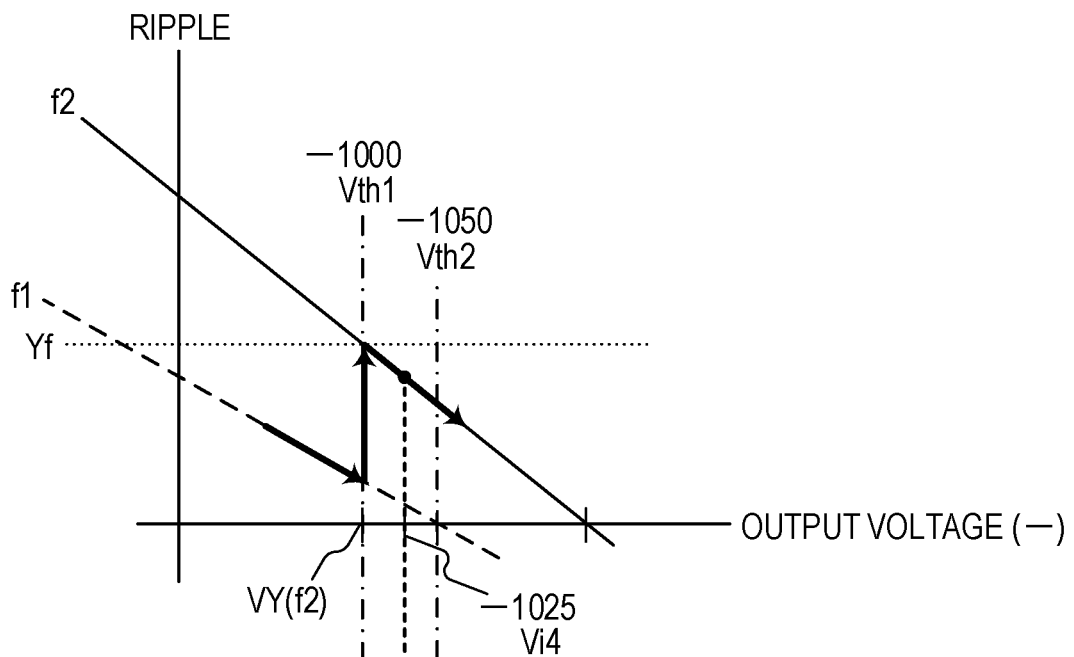
FIG. 10A and FIG. 10B are graphs for showing a method of varying the output voltage of the high voltage power source unit in the second embodiment.
Figure 10B:
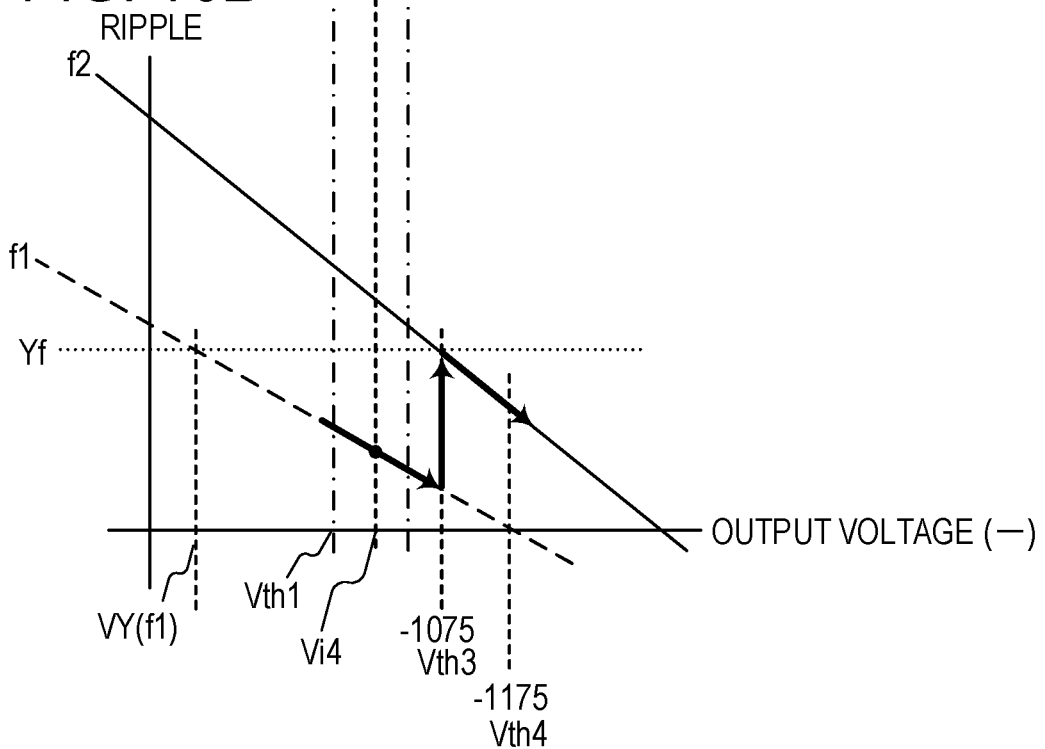

Next, sequences of increasing the output voltage are described with reference to FIG. 10A and FIG. 10B. FIG. 10A shows a relationship between the output voltage and the ripple obtained when the load current is large, and FIG. 10B shows the relationship obtained when the load current is small, for the frequency f1 (broken line) and the frequency f2 (solid line). Next, a sequence of increasing the output voltage from an initial output voltage Vi4 is described. As an example, the initial output voltage Vi4 is −1,025 V.

When Load Current is Large

When the load current is large, as shown in FIG. 10A, the initial output voltage Vi4 (−1,025 V) is larger than the threshold value Vth1 (−1,000 V), and hence the operation is performed at the frequency f2. The target voltage signal S201 is changed therefrom to increase the output voltage, which can be changed up to the output voltage which is the output capacity limit at the frequency f2 of the drive signal S202. When the output voltage at the beginning is smaller than the threshold value Vth1, and the output voltage is to be increased, the operation is performed first at the frequency f1, and a switch is made from the frequency f1 to the frequency f2 at the threshold value Vth1 to increase the output voltage. Further, when the output voltage is increased without changing the frequency f1, the generated ripple is maintained equal to or smaller than the allowable output voltage ripple Yf, and hence the switch to the frequency f2 may not be made.

When Load Current is Small

When the load current is small, a characteristic as shown in FIG. 10B is obtained. With the initial output voltage Vi4 being larger than the threshold value Vth1 (−1,000 V), the operation at the frequency f2 leads to a state in which the ripple in the output voltage exceeds the allowable output voltage ripple Yf at the frequency f2, and there is a fear in that an image defect may occur. To address this problem, when the load current is small, as shown in FIG. 10B, the frequency is switched at the boundary of the threshold value Vth3 (−1,075 V) (>Vth1). In other words, with the initial output voltage Vi4 (−1,025 V) being smaller than the threshold value Vth3 (−1,075 V), the operation is performed at the frequency f1. Then, the output voltage is increased, and when the threshold value Vth3 is reached, a switch can be made from the frequency f1 to the frequency f2 to change the output voltage up to an output limit voltage at the frequency f2. The output voltage may be changed up to the output limit voltage at the frequency f1 when the load current is small without switching the frequency from the frequency f1 at the threshold value Vth3, and the voltage can be changed over a wide range.

As described above, in the case of increasing the output voltage from the output voltage at the beginning, the controller 3 performs the following control based on the result of the detection by the load current detection circuit 501. Specifically, when the electric current detected by the load current detection circuit 501 is equal to or smaller than the predetermined value, the controller 3 sets the threshold value for switching the frequency to the threshold value Vth3 which is a fourth threshold value. Here, the threshold value Vth3 is larger than the threshold value Vth1 which is the first threshold value for switching the frequency when the electric current detected by the load current detection circuit 501 is larger than the predetermined value.

As described above, in addition to the sequence of increasing or reducing the output voltage from the initial output voltage, the threshold value for switching the frequency of the drive signal S202 is changed depending on the load current. As a result, when the load current has been changed significantly, the optimal frequency of the drive signal S202 can be set for each case.

Further, as illustrated in FIG. 6, a nonvolatile memory 510 which is a storage portion capable of communicating to/from the controller 3 with a communication signal S204 may be used. With a variation in L-value of the transformer 201 being taken in consideration for each substrate used in the high voltage power source unit 500, the duty and the frequency of the drive signal S202 can be adjusted for each unit. As a method therefor, there is known a method involving measuring an output characteristic of the high voltage power source unit 500 in advance on a manufacturing line, and storing the measured output characteristic in the nonvolatile memory 510. In this manner, the high voltage power source unit 500 may include the storage portion storing information associating the output voltage with the duty and the frequency, and information on threshold values for use in increasing and reducing output power. Further, the storage portion may store a plurality of pieces of information associating the output voltage with the duty and the frequency and the information on the threshold values depending on the electric current flowing through the load. In this manner, through the measurement of the output characteristic for each load current of the high voltage power source unit 500 in advance, and the storage of the measured output characteristic in the storage portion, the output voltage can be controlled to a suitable value irrespective of the variation in L-value of the transformer 201.

As described above, according to the second embodiment, in the power source apparatus capable of changing the output voltage, the generation of the ripple in the output voltage and the power consumption can be reduced.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-098068, filed Jun. 11, 2021, which is hereby incorporated by reference herein in its entirety.

What is claimed is:

1. A power source apparatus, comprising:
a transformer including a primary coil and a secondary coil;
a switching element which is connected in series to the primary coil, and is configured to be turned on or off according to a control signal input to the switching element; and
a control unit configured to control the switching element by outputting the control signal having a predetermined duty to the switching element,
wherein the control unit is configured to switch a target voltage of an output voltage that is output from a secondary side of the transformer,
wherein the control unit is configured to:
in a case of increasing the output voltage by switching the target voltage, output the control signal having a first duty when the target voltage is lower than a first threshold value, and output the control signal having a second duty which is larger than the first duty when the target voltage is switched to a value equal to or higher than the first threshold value; and
in a case of reducing the output voltage by switching the target voltage, output the control signal having the second duty when the target voltage is equal to or higher than a second threshold value, and output the control signal having the first duty when the target voltage is switched to a value lower than the second threshold value,
wherein the first threshold value and the second threshold value are different from each other,
wherein the second threshold value is larger than the first threshold value, and
wherein the first threshold value is a voltage when the switching element is turned on or off with the second duty with which a ripple in the output voltage becomes an allowable maximum ripple.

2. The power source apparatus according to claim 1, further comprising a detection unit configured to detect an electric current flowing through a load to which the output voltage is supplied,
wherein the control unit is configured to change the first threshold value and/or the second threshold value based on a detection result by the detection unit.

3. The power source apparatus according to claim 2, wherein in the case of reducing the output voltage, the control unit is configured to set a threshold value for switching the predetermined duty when the electric current detected by the detection unit is equal to or smaller than a predetermined value to a third threshold value which is larger than the second threshold value for switching the predetermined duty when the electric current detected by the detection unit is larger than the predetermined value.

4. The power source apparatus according to claim 2, wherein in the case of increasing the output voltage, the control unit is configured to set a threshold value for switching the predetermined duty when the electric current detected by the detection unit is equal to or smaller than a predetermined value to a fourth threshold value which is larger than the first threshold value for switching the predetermined duty when the electric current detected by the detection unit is larger than the predetermined value.

5. The power source apparatus according to claim 2, further comprising a storage portion configured to store information associating the output voltage and the predetermined duty with each other,
wherein the storage portion is configured to store a plurality of pieces of the information corresponding to the electric current flowing through the load.

6. The power source apparatus according to claim 1, wherein a maximum value of the output voltage output according to the second duty is larger than a maximum value of the output voltage output according to the first duty.

7. The power source apparatus according to claim 1, wherein a ripple when a predetermined output voltage is output according to the second duty is larger than a ripple when an output voltage that is substantially the same as the predetermined output voltage is output according to the first duty.

8. The power source apparatus according to claim 1, further comprising a stop unit configured to stop an input of the control signal from the control unit to the switching element so that the output voltage approaches the target voltage.

9. A power source apparatus, comprising:
a transformer including a primary coil and a secondary coil;
a switching element which is connected in series to the primary coil, and is configured to be turned on or off according to a control signal input to the switching element; and
a control unit configured to control the switching element by outputting the control signal having a predetermined frequency to the switching element,
wherein the control unit is configured to switch a target voltage of an output voltage that is output from a secondary side of the transformer,
wherein the control unit is configured to:
in a case of increasing the output voltage by switching the target voltage, output the control signal having a first frequency when the target voltage is lower than a first threshold value, and output the control signal having a second frequency which is larger than the first frequency when the target voltage is switched to a value equal to or higher than the first threshold value; and
in a case of reducing the output voltage by switching the target voltage, output the control signal having the second frequency when the target voltage is equal to or higher than a second threshold value, and output the control signal having the first frequency when the target voltage is switched to a value lower than the second threshold value,
wherein the first threshold value and the second threshold value are different from each other,
wherein the second threshold value is larger than the first threshold value, and
wherein the first threshold value is a voltage when the switching element is turned on or off with the second frequency with which a ripple in the output voltage becomes an allowable maximum ripple.

10. The power source apparatus according to claim 9, further comprising a detection unit configured to detect an electric current flowing through a load to which the output voltage is supplied,
wherein the control unit is configured to change the first threshold value and/or the second threshold value based on a detection result by the detection unit.

11. The power source apparatus according to claim 10, wherein in the case of reducing the output voltage, the control unit is configured to set a threshold value for switching the predetermined frequency when the electric current detected by the detection unit is equal to or smaller than a predetermined value to a third threshold value which is larger than the second threshold value for switching the predetermined frequency when the electric current detected by the detection unit is larger than the predetermined value.

12. The power source apparatus according to claim 10, wherein in the case of increasing the output voltage, the control unit is configured to set a threshold value for switching the predetermined frequency when the electric current detected by the detection unit is equal to or smaller than a predetermined value to a fourth threshold value which is larger than the first threshold value for switching the predetermined frequency when the electric current detected by the detection unit is larger than the predetermined value.

13. The power source apparatus according to claim 10, further comprising a storage portion configured to store information associating the output voltage and the predetermined frequency with each other,
wherein the storage portion is configured to store a plurality of pieces of the information corresponding to the electric current flowing through the load.

14. The power source apparatus according to claim 9, wherein a maximum value of the output voltage output according to the second frequency is larger than a maximum value of the output voltage output according to the first frequency.

15. The power source apparatus according to claim 9, wherein a ripple when a predetermined output voltage is output according to the second frequency is larger than a ripple when an output voltage that is substantially the same as the predetermined output voltage is output according to the first frequency.

16. The power source apparatus according to claim 9, further comprising a stop unit configured to stop an input of the control signal from the control unit to the switching element so that the output voltage approaches the target voltage.

17. An image forming apparatus comprising:
an image forming unit configured to form an image on a recording medium; and
a power source apparatus configured to supply an electric power to the image forming unit, the power source apparatus including:
    a transformer including a primary coil and a secondary coil;
    a switching element which is connected in series to the primary coil, and is configured to be turned on or off according to a control signal input to the switching element; and
    a control unit configured to control the switching element by outputting the control signal having a predetermined duty to the switching element,
wherein the control unit is configured to switch a target voltage of an output voltage that is output from a secondary side of the transformer,
wherein the control unit is configured to:
    in a case of increasing the output voltage by switching the target voltage, output the control signal having a first duty when the target voltage is lower than a first threshold value, and output the control signal having a second duty which is larger than the first duty when the target voltage is switched to a value equal to or higher than the first threshold value; and
    in a case of reducing the output voltage by switching the target voltage, output the control signal having the second duty when the target voltage is equal to or higher than a second threshold value, and output the control signal having the first duty when the target voltage is switched to a value lower than the second threshold value,
wherein the first threshold value and the second threshold value are different from each other,
wherein the second threshold value is larger than the first threshold value, and
wherein the first threshold value is a voltage when the switching element is turned on or off with the second duty with which a ripple in the output voltage becomes an allowable maximum ripple.

18. An image forming apparatus comprising:
an image forming unit configured to form an image on a recording medium; and
a power source apparatus configured to supply an electric power to the image forming unit, the power source apparatus including:
    a transformer including a primary coil and a secondary coil;
    a switching element which is connected in series to the primary coil, and is configured to be turned on or off according to a control signal input to the switching element; and
    a control unit configured to control the switching element by outputting the control signal having a predetermined frequency to the switching element,
wherein the control unit is configured to switch a target voltage of an output voltage that is output from a secondary side of the transformer,
wherein the control unit is configured to:
    in a case of increasing the output voltage by switching the target voltage, output the control signal having a first frequency when the target voltage is lower than a first threshold value, and output the control signal having a second frequency which is larger than the first frequency when the target voltage is switched to a value equal to or higher than the first threshold value; and
    in a case of reducing the output voltage by switching the target voltage, output the control signal having the second frequency when the target voltage is equal to or higher than a second threshold value, and output the control signal having the first frequency when the target voltage is switched to a value lower than the second threshold value,
wherein the first threshold value and the second threshold value are different from each other,
wherein the second threshold value is larger than the first threshold value, and
wherein the first threshold value is a voltage when the switching element is turned on or off with the second frequency with which a ripple in the output voltage becomes an allowable maximum ripple.

* * * * *